March 31, 1959  O. B. LUNDÉN ET AL  2,880,145
DEVICE FOR DISTILLATION
Filed March 10, 1955  2 Sheets-Sheet 1
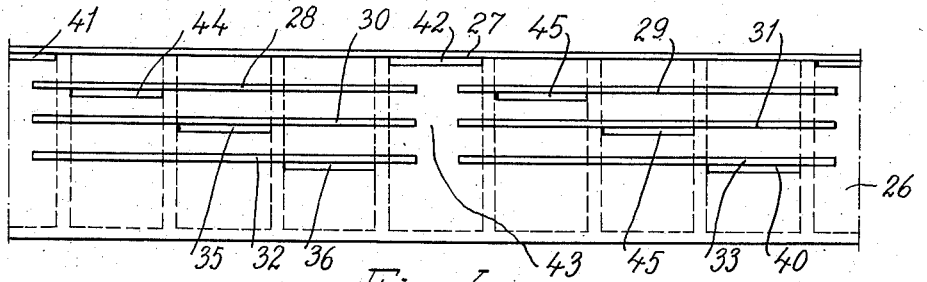
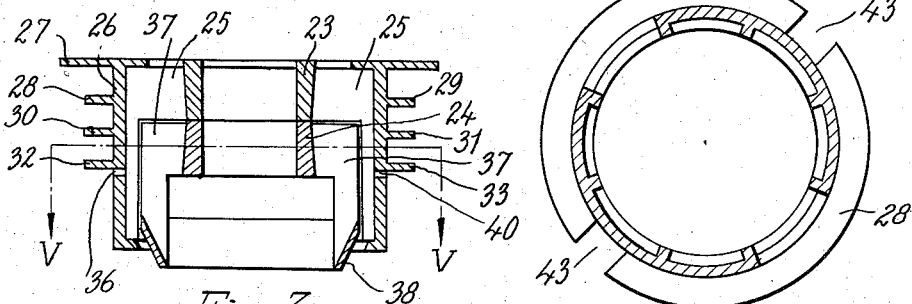
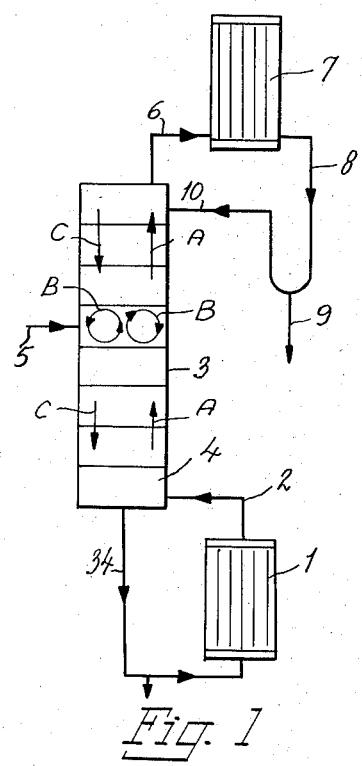
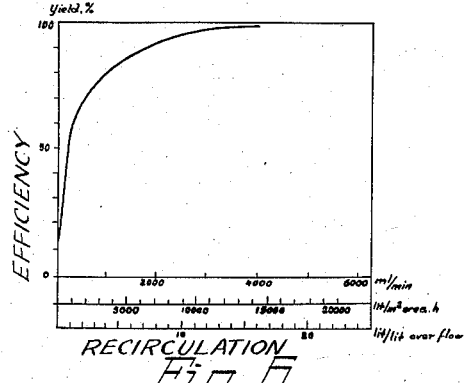
INVENTORS:-
Olof Bertil Lundén and
Karl Gunnar Wenomon,
BY
Their Attorneys.

United States Patent Office 2,880,145
Patented Mar. 31, 1959

2,880,145

DEVICE FOR DISTILLATION

Olof Bertil Lundén, Skutskar, and Karl Gunnar Wensman, Falun, Sweden, assignors to Stora Kopparbergs Bergslags Aktiebolag, Falun, Sweden, a corporation of Sweden Application March 10, 1955, Serial No. 493,486

Claims priority, application Sweden March 11, 1954

4 Claims. (Cl. 202—158)

The present invention relates to a device for performing distillation, preferably in vacuum, the distillation being carried out in a column provided with rotary elements for the dissipation and atomizing of the downflow from each plate of the column, said elements being supported by a central shaft.

In fractional distillation within the range of 1–50 mm. Hg absolute pressure a distillation column has to meet special demands. The ratio of the volume, as measured at the actual pressure of the vapor passing upwardly through the column and the quantity of liquid flowing downwardly will be extremely large. A condition for obtaining a high efficiency in a vacuum distillation column is that it should be able to operate with a low downflow from each plate at high vapor velocity.

Another condition is that the pressure drop through the column should be low, since otherwise the bottom of the pressure in the still cannot at all be reduced to the desired value or the latter can only be obtained when the pressure at the top of the column is kept very low.

Said conditions are not commonly met at the same time either in packed columns or in bubble cap or perforated plate columns, especially not when working within the pressure range of 1–20 mm. Hg.

Several times it has been proposed to obtain a good contact between vapor and liquid in a distillation column by the dissipation or atomizing of the liquid by means of rotary members. The method has also been applied on a laboratory scale, but up to now no construction has been developed which makes it possible to practice this principle with success on a factory scale.

The present invention relates to an improved apparatus in this art, in which a distillation column of the type stated above is used, and is characterized in that liquid is thrown outwardly from the rotary elements and then collected and returned to the centre of the column, where it is pumped upwardly and again thrown outwardly by the same rotary elements. A liquid quantity appreciably larger than the down-flow from a plate is thrown outwardly from each rotary element, and the liquid is thrown outwardly from the rotary elements in such a manner that vapor ascending through the column passes through one or more layers of droplets.

The invention includes a device comprising a column provided with rotary elements for the dissipation and atomizing of the down-flow from each plate of the column, said elements being supported by a central shaft, in which the rotary elements are designed such that the liquid from each rotary element is thrown outwardly on a plurality of horizontal levels and in a quantity, which for each rotary element is appreciably larger than the downflow from the corresponding plate, each plate including channels for the collection and returning of the liquid thrown out into a bowl at the centre of the column, where a pumping member is provided in order to pump the liquid upwardly and to throw it outwardly again by means of the same rotary element.

According to a preferred embodiment of this device each plate of the column on the one hand includes annular troughs for the collection of the liquid thrown out, and on the other radial channels for returning the liquid to the center of the column.

In a further embodiment the channels for the collection and returning of the liquid and the central bowl surround open channels for the passage of the vapor through the column, said latter channels having a total free cross sectional area amounting at least to 30% of the cross sectional area of the column.

According to an additional feature of the present device the rotary elements have horizontal flanges preventing the distribution of the liquid in an axial direction.

The invention will now be more closely explained with reference to an embodiment diagrammatically shown in the attached drawings and in connection therewith further characterizing features of the invention will be set forth.

Figure 1 is a diagrammatic view of a plant, to which the present invention may be applied.

Figure 3 is a vertical section of a rotor element of Figure 2.

Figure 4 shows the surface of a rotor element in a developed form.

Figure 5 is a horizontal projection of the rotor element on the line V—V in Figure 3.

Figure 6 is a chart of the plate efficiency indicated as a function of the recirculation on each plate.

Figure 2:
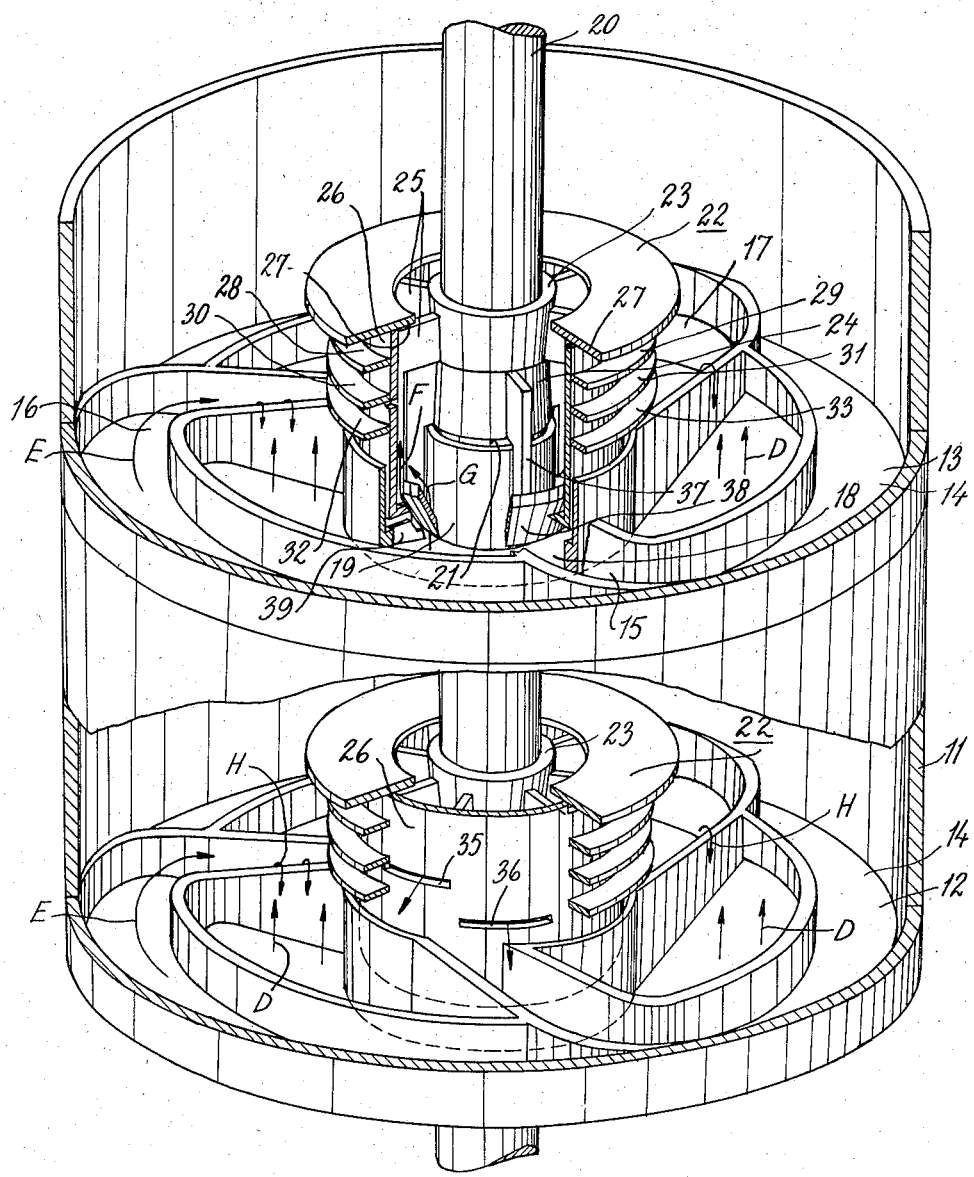
Figure 2 illustrates in a perspective view two plates of the column.

In Figure 1 reference numeral 1 designates a heater supplied by steam or electric power. The vapor generated therein will pass through the conduit 2 to the still 4, from where it will ascend through the plates of the column as indicated by the arrows A. The feed, which is to be distilled, enters the column through the conduit 5, whereupon it will circulate on each plate as indicated by the arrows B. The distilled volatile material escapes from the uppermost plate of the column through the conduit 6 and enters a condenser 7, from which liquid distillate is drained through the conduit 8. The distillate is removed at 9. Part of the distillate continues as a reflux through the conduit 10 and back to the column. Through the column said material moves downwardly as indicated by the arrows C.

Figure 2 is a detail of the column 3 in Figure 1. The column is encased by a jacket 11 and provided with a number of plates, two of which are viewed in the drawing. Between the two plates 12 and 13 shown there is arranged a further plate which is removed for the sake of clarification. The two plates shown are identical and the same reference numerals are used for identical details.

An annular trough 14 is arranged internally of the jacket 11. Extending from the annular flute 14 are radial troughs 15, 16 and 17. The radial flutes converge into a central bowl 18. Said bowl terminates at its inner portion in a vertical annular member 19, which surrounds a rotor shaft 20. A space 21 is provided between the rotor shaft 20 and the annular member 19. Rotor elements 22 are attached to the shaft 20 by means of the means 23, 24. From the upper attachment means 23 fins 25 protrude radially and at the other end of said fins there is provided a casing 26 coaxial with the rotor shaft 20. Projecting from the surface of the casing 26 are flanges 27, 28, 29, 30, 31, 32, 33. The surface of the casing is also provided with openings, two of which are seen in Figure 2, viz. 35 and 36. Said openings 35 and 36 are off-set and open just below the respective flanges. On the lower attachment means 24 there are fins 37 which carry at their opposite end a conical member 38 designed as a truncated conical surface. Provided in the central bowl 18 are guiding or conveying surfaces or baffles 39 adapted to convey liquid towards the center of the bowl.

In Figure 3 the rotor element is shown in a vertical sectional elevation. The rotor element comprises two attachment means, an upper one 23 and a lower one 24. Said means are intended to surround by being attached thereto the rotor shaft 20. From the upper attachment means fins 25 project and at the other end thereof a vertical annular casing 26 is secured. Seven flanges project from the casing. The upper one 27 extends somewhat beyond the others 28, 29, 30, 31, 32, 33. Below each flange openings (36 and 40) are provided in the casing. From the lower attachment means 24 fins 37 extend, which in their lower end carry a conical part 38 which is formed as a truncated conical casing surface.

In Figure 4 the developed surface of the casing 26 is shown as provided with the flanges 27—33. Located below the upper flange 27 are the openings 41, 42. The remaining flanges are arranged in pairs and separated by a space 43. Below the next lower pair of flanges 28, 29 the openings 44, 45 are provided, below the next pair of flanges 30, 31 the openings 35 and below the lowest pair of flanges 32, 33 the openings 36 and 40.

Figure 5 shows a horizontal section through the rotor element shown in Figure 3 on the line V—V. From this figure and also from Figure 4 it will be evident that the pair of flanges 32, 33 is divided into two semicircular parts arranged with an interspace 43.

Figure 6 is a diagram illustration showing the efficiency increment of the plate with increasing recirculation.

In the chart the efficiency of the plate is indicated as an ordinate and the recirculation on each plate is expressed in different ways as an abscissa.

The operation of the apparatus will now be explained with reference to the drawings.

The vapor leaves the still 1 and traverses the column through the free areas formed in each plate between the annular trough 14 and the radial return troughs 15, 16 and 17 as shown in Figure 2 by the arrows D. In each plate passed an exchange of substance occurs between the vapors and the liquid circulating on each plate. After passing all the plates the vapor enters the condenser 7 where it is condensed into a liquid state. Through the conduit 9 part of the liquid distillate thus obtained is removed whereas another part is returned as reflux to the column 3. This reflux will then descend in the column in form of a down-flow while exchanging a part of its substance with that of the ascending vapor and leaves the column through the conduit 34. Part of liquid is withdrawn and part is passed to the boiler 1. The liquid in the rotor element is thrown out in a finely divided form from the central rotating element 22 towards the column wall 11. In the embodiment shown the liquid is thrown out in four superposed layers through the openings 41, 44, 35, 36, 42, 45, 46 and 40 arranged in the casing 26. The droplets thrown out will then pass through the ascending flow of vapor while exchange of substance occurs. The liquid thrown out is collected in the troughs 14 and returned to the same rotor element via the troughs 15, 16 or 17 as shown by the arrows E and flows down into the central bowl 18. In the embodiment shown the number of return troughs is three but the number may of course be varied. In the central bowl 18 baffles 39 are provided which carry the liquid towards the center. Through the rotation of the rotary element and the conical member 38 the liquid is pumped up into the rotor element 22 as shown by the arrows F and G and thrown out again through the openings 41, 44, 35, 36, 42, 45, 46 and 40. Part of the liquid thrown out is not returned to the rotary member but flows as an overflow down into the next lower rotary member as is shown by the arrows H. The liquid will thus when passing downwardly through the column be recirculated on each plate a plurality of times. Thereby the exchange of heat and substance will be considerably more complete than in case the liquid is merely thrown out once from each rotor and thereafter continues to the next lower column plate.

The factors, which at a given velocity of the gas and a given pressure in the column primarily define the plate efficiency, are on one hand the total surface of the liquid particles formed per unit of time and on the other hand the velocity of the liquid particles. The size of the liquid surface is defined by the quantity of liquid and the degree of division, the velocity of the droplets is defined by the peripherical velocity of the rotor and to a certain degree by the size of the droplets. In order to obtain a good efficiency a large circulating quantity of liquid is required, a high degree of division up to a certain limit and a high velocity of the droplets. This is obtained by means of a good pump efficiency and a high peripherical velocity of the rotor members. Figure 6 illustrates how the plate efficiency increases with increasing recirculation. In this case, which deals with distillation at atmospheric pressure, an efficiency amounting to 50% is attained when the liquid is merely thrown out once, whereas the efficiency increases up to 96% at forced circulation up to 15 times. With increasing velocity of the gas and thereby a shorter time of contact between gas and liquid the demands for the surface size of the liquid particles and the velocity thereof increase. At distillation in vacuum, when the velocity of the gas should be high, the forced circulation should be still higher than has been illustrated above in order to obtain a good plate efficiency and it may be preferred to attain a recirculation amounting to 100 times. The consumption of power for said recirculation is inconsiderable as compared with that which may be saved by diminishing the boiling up requirement.

In order to obtain a vigorous recirculation on each plate simultaneously as the liquid particles are kept apart the rotor should suitably be formed in such a way that the liquid will be spread out on different levels from one and the same rotor. The gas thereby on each plate will pass through a thick layer of atomized liquid, the height of which will amount to at least 20%, preferably to about 50% of the total height of the column plate.

It is also very essential in the design of an apparatus according to the invention that the rotor members are formed in such a way that the liquid droplets are thrown out from the rotor in such a way as not to be spread out into an axial direction, particularly that they are not spread in the same direction as the vapor is flowing, that is in direction towards the next upper rotor. If this occurs and liquid droplets from a plate thus are mixed with the liquid on the next upper plate (so-called entrainment) the efficiency of separation of the column decreases and may possibly entirely disappear. If no particular consideration is put to said effect in the construction of the rotor members, the distance between the plates has to be made considerable in order to obtain an acceptable efficiency of separation which in turn is a great disadvantage in designing a column in which each extension of the column involves a pronounced problem in mounting the rotor shaft etc.

The invention is also characterized by the fact that the liquid particles thrown out at their passage through the gas channel have such a velocity that in spite of their small size they will have no time to get any upwardly directed component of velocity from the gas even if the velocity of the gas is very great. Also said condition should thus be satisfied in order to avoid so-called entrainment.

Since the elements of construction comprised on each column plate, that is the annular flute 14, the return flutes or pipes 15, 16 and 17, the central bowl 18 and the rotor 22 (see Figures 2–5) may be formed in such a way that they do not cover more than 30 to 70% of the total area of the column, there is available for the passage of the gas through each plate a free area corresponding to 70 to 30% of the area of the column. When the plates are assembled from said free areas, straight or spiral-shaped, empty channels are formed through which the gas may pass practically without any pressure drop in the axial direction from the still towards the condenser. The counter pressure in the column will be so low (of the order of 0.1 mm. Hg per plate) that any members for the compression of the gas in the axial direction can be dispensed with.

Since vacuum distillation is generally used when the substances are to be protected from a long heating time up to a high temperature, as in the distillation of tall acid it is also essential that the liquid amount of the column per theoretical plate in operation be small. Also in this case the construction in question satisfies high demands and may attain a value of 3 to 10 litres per theoretical plate per square metre of column area.

Summarizing it may be said that the invention relates to a distillation column which may be used for distillation especially within the range of 1 to 20 mm. Hg pressure but also with an extraordinary result at pressures amounting to atmospheric pressure or higher which combines a low theoretical plate height with a small pressure drop, high capacity and a low hold-up.

As an example of the use of the apparatus some data in the distillation of tall acid are presented. The example has for its purpose to illustrate the field of utilization but does not disclose the maximum capacity of the apparatus.

In a column of 410 mm. outer diameter, 10 plates having a plate height of 115 mm., the r.p.m. of the rotor being 1500, onto the 4th plate from bottom 55 kilogram per h. of tall fatty acid containing 21% of resin acids was charged. The pressure was 7 mm. Hg at the top of the column and the pressure drop of the entire column was 1.0 mm. Hg. The boiling off from the still was 100 kg. per h. which corresponds to a velocity of vapor in the column of 2.8 m. per second at 240° C. and the pressure in question. The removal of distillate was 32 kg./h. and the reflux ratio was about 2.5:1. The distillate contained 1.2% of resin acids, which corresponds to a plate efficiency of about 50%, that is a theoretical plate height of 230 mm. The capacity of production was 250 kg./h. of distillate per square metre of the total column area. If the r.p.m. of the rotor was decreased below 1000 the plate efficiency was rapidly decreased while on the other hand no appreciable improvement (nor a deterioration) occurred if the r.p.m. was increased above 1500. The contents of liquid per plate was 0.6 litre corresponding to 1.2 litres per theoretical plate or 8 litres per theoretical plate per square metre of column area. The average time of stay in the column was about 5 minutes. The recirculation of the liquid on each plate was 3000 kg. per h., that is 38 times the down-flow.

The invention is not limited to the embodiment shown and described but may be varied in several respects within the scope of the basic inventive idea.

Having now particularly described and ascertained the nature of our said invention and which manner the same is to be performed, we declare that what we claim is:

1. In an apparatus for fractionally distilling a charged liquid under vacuum to separate a volatile constituent which comprises a fractionating column, means for charging said liquid to said column, means associated with the lower portion of said column for heating and vaporizing constituents of said charged liquid, a plurality of vertically spaced laterally extending plates in said column, each of said plurality of plates having a zone permitting free passage of vapors upwardly in said column, each of said plurality of plates including entrapment means in the form of open troughs lying outwardly of the zone of ascending vapor to entrap condensate, means in the form of open troughs for directing said condensate by gravity flow from said entrapment means to a portion of said column lying inwardly of the zone of said ascending vapor, said entrapment means and said directing means surrounding open free spaces for ascent of vapors through said column and said free spaces constituting at least 30% of the cross-sectional area of the column, centrifugal rotor means located centrally of said plates constructed to impel the inwardly flowing liquid upwardly, outwardly and laterally across said ascending vapor to provide a layer of dispersed liquid whose thickness is at least 20% of the total height between the plates and thereby returning it to said entrapment means repeatedly for recirculation by said gravity and centrifugal flow cyclically across each of said plate locations, means for applying a vacuum to said fractionating column, means for removing vapor of the volatile constituent of said charged liquid from the upper portion of said column, means for establishing as reflux in said column a downward flow of condensed constituents of said charged liquid, and means for rotating said rotor means so that the quantity of liquid flowing outwardly is appreciably larger than the liquid downflow from the vertically spaced plates.

2. An apparatus as defined in claim 1, in which said entrapment means extend in a generally annular direction and said directing means extend in a generally radial direction.

3. In an apparatus for fractionally distilling a charged liquid under vacuum to separate a volatile constituent which comprises a fractionating column, means for charging said liquid to said column, means associated with the lower portion of said column for heating and vaporizing constituents of said charged liquid, a plurality of vertically spaced laterally extending plates in said column, each of said plurality of plates having a zone permitting free passage of vapors upwardly in said column, each of said plurality of plates including entrapment means in the form of open troughs lying outwardly of the zone of ascending vapor to entrap condensate, means in the form of open troughs for directing said condensate by gravity flow from said entrapment means to a portion of said column lying inwardly of the zone of said ascending vapor, said entrapment means and said directing means surrounding open free spaces for ascent of vapors through said column and said free spaces constituting at least 30% of the cross-sectional area of the column, centrifugal rotor means located centrally of said plates constructed to impel the inwardly flowing liquid upwardly, outwardly and laterally across said ascending vapor to provide a layer of dispersed liquid whose thickness is at least 20% of the total height between the plates and thereby returning it to said entrapment means repeatedly for recirculation by said gravity and centrifugal flow cyclically across each of said plate locations, means for applying a vacuum to said fractionating column, means for removing vapor of the volatile constituent of said charged liquid from the upper portion of said column, means for establishing as reflux in said column a downward flow of condensed constituents of said charged liquid, and means for rotating said rotor means so that the quantity of liquid flowing outwardly is appreciably larger than the liquid downflow from the vertically spaced plates, said centrifugal rotor means comprising a cylindrical rotating member having apertures vertically disposed around its periphery for the passage of the outwardly flowing liquid and having laterally positioned plate means disposed on the outer surface of the rotating member and overlying said apertures.

4. An apparatus as described in claim 1 wherein said free spaces constitute 30 to 70% of the cross-sectional area of the column and the layer of dispersed liquid has a thickness of 20 to 50% of the total height between the plates.

References Cited in the file of this patent

UNITED STATES PATENTS

| | | |
|---|---|---|
| 444,152 | Madlener | Jan. 6, 1891 |
| 1,637,975 | Wagner | Aug. 2, 1927 |
| 1,669,795 | Wagner | May 15, 1928 |
| 1,953,730 | Stratford | Apr. 3, 1934 |
| 2,073,026 | Renfrew et al. | Mar. 9, 1937 |
| 2,218,240 | Hickman | Oct. 15, 1940 |
| 2,349,431 | Hickman | May 23, 1944 |
| 2,694,675 | Hogan | Nov. 16, 1954 |
| 2,699,225 | Dahlbeck | Jan. 11, 1955 |

FOREIGN PATENTS

| | | |
|---|---|---|
| 524,439 | Great Britain | Aug. 6, 1940 |